C. F. HETTINGER.
COMBINED HOP PRESS AND HOP STRAINER.
APPLICATION FILED JAN. 10, 1913.
1,083,013.
Patented Dec. 30, 1913.
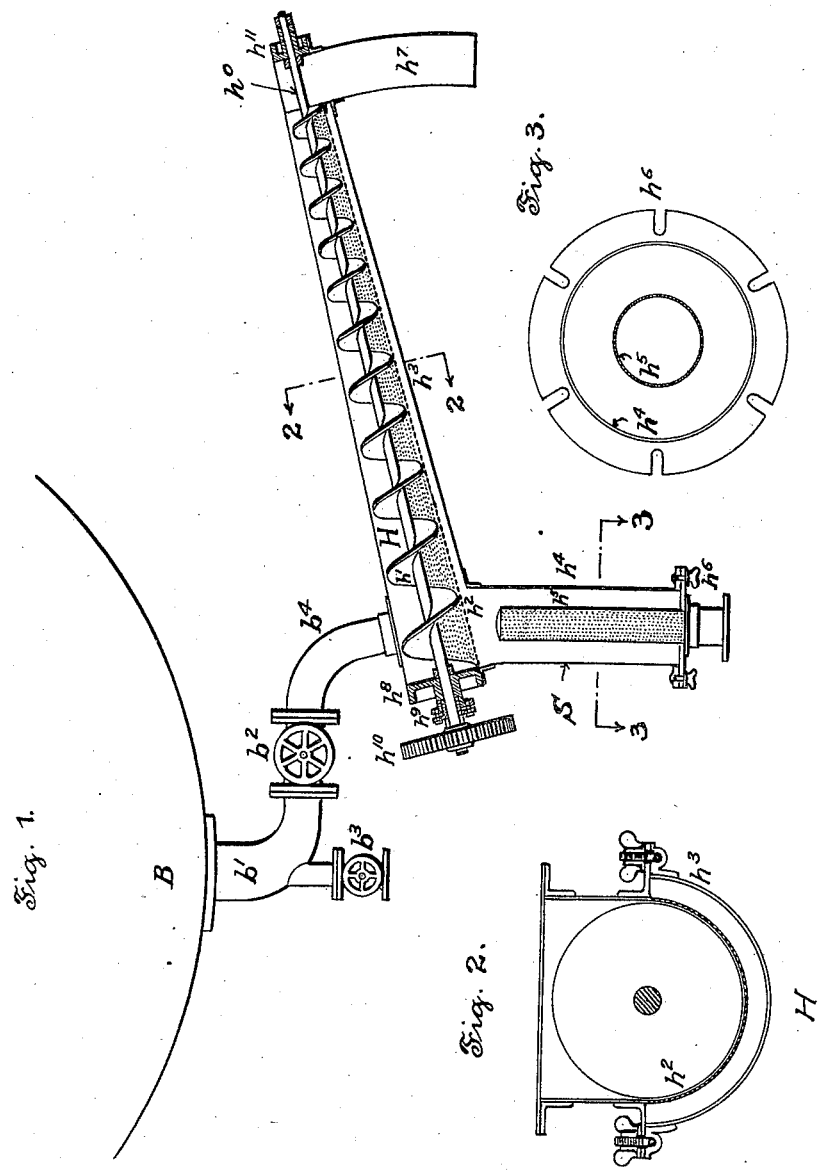

UNITED STATES PATENT OFFICE.

CARL F. HETTINGER, OF BOSTON, MASSACHUSETTS.

COMBINED HOP-PRESS AND HOP-STRAINER.

1,083,013.   Specification of Letters Patent.   Patented Dec. 30, 1913.

Application filed January 10, 1913.   Serial No. 741,236.

*To all whom it may concern:*

Be it known that I, CARL F. HETTINGER, a citizen of the United States, residing at Boston, in the county of Suffolk and State of Massachusetts, have invented a new and useful Combined Hop-Press and Hop-Strainer, of which the following is a specification.

My invention relates to means for removing the hops from the wort or malt liquor, when the latter is ready to be drawn from the vessel in which the hops have been added to the brew. Heretofore many devices have been in use to accomplish this, and the most common process is to use a hop-jack, a vessel having a perforated bottom some distance above the real bottom of the vessel or hop-jack, and as this vessel has to have the same capacity as the brewing kettle such hop-jack takes up considerable space. Furthermore, such hop-jack has to be cleaned after every brew, necessitating the lifting of the sectional perforated bottom and cleaning each section of the said bottom. This is a tedious work taking considerable time as the wet and spent hops will adhere to the perforated plates most tenaciously. Further, these spent hops, to save about from 3 to 5% of the wort still contained in them, are generally sparged or sprinkled with warm water. The hop-jack further has the disadvantage that the filtering of the wort is retarded, as the hops will clog up the perforations in the false bottom. In my Letters Patent No. 763,606 of June 28, 1904, I described a hop-strainer which is in successful use in a number of breweries, but it has the disadvantage that the extraction of the wort from the hops contained in the strainer is too slow, because of the small area of the strainer. To overcome these and other disadvantages, I have invented a device by which the hop-jack may be dispensed with and which device is attached directly to the brewing kettle, and serves to press the spent hops and deliver the same almost dry to a receptacle, while the combined malt-wort and hop-wort or as it is then called malt-liquor is further strained by a finely perforated sieve, strainer or filter.

My invention therefore relates to a combined hop-press and hop-strainer, and consists of a conical spiral conveyer adapted to remove the hops from the malt-liquor, and a strainer located below the said conveyer to withhold from the passing liquor all foreign substances and the hop seeds, etc.

My invention further consists of the improvements hereinafter more fully described and pointed out in the claims.

My invention will be more fully understood taken in connection with the accompanying drawings forming part of this application and in which:

Figure 1 is a sectional view of the conical helical conveyer and the strainer and showing its attachment to the brewing kettle. Fig. 2 is a section on line 2—2 of Fig. 1, through the conical helical conveyer, and Fig. 3 is a section on line 3—3 of Fig. 1, showing the strainer.

Referring now to the drawings for a further description of my invention, B is the brewing kettle of the ball-shape now commonly used.

$b^1$ is an elbow with a discharge valve $b^2$, $b^3$ is a wash-out valve for admitting water to the brewing-kettle, and $b^4$ is a pipe conducting the wort and spent-hops to the conical conveyer H. This conical helical conveyer H is made of any suitable metal and comprises the conical housing or shell $h^3$, the perforated semicircular false bottom $h^2$, and the helical conveyer blades $h^1$ mounted on the shaft $h^\circ$. This shaft $h^\circ$ is journaled in the end pieces $h^8$ and $h^{11}$ and is driven by means of the gear wheel $h^{10}$ from a motor or other source. $h^9$ is a stuffing box at the end piece $h^8$. This conveyer is mounted at an angle in order to permit the wort carried along with the hops or pressed therefrom to run along the bottom $h^3$ of the conveyer into the strainer S.

$h^7$ is the discharge spout for the dry spent hops and conducts the same into any suitable receptacle not shown, and which may be mounted on wheels for easy transportation and may also be provided with any suitable means for emptying. The discharge end of the conical conveyer, however, may be connected with any other means for disposing of the spent hops.

Connected directly with the shell $h^3$ is the strainer S comprising the cylindrical casing $h^4$ and finely perforated mantle $h^5$, this latter is secured to the removable disk $h^6$ held by means of handscrews onto the casing $h^4$.

The operation of my combined hop-press and hop-strainer may be described as follows: After the boiling process of the malt brew with the hops in the brewing kettle, (the hop-jack being entirely dispensed with) is completed, the brew with the hops is discharged by opening the valve $b^2$ and allowing the brew to enter the conical helical conveyer H, this having been set previously into operation moves the spent hops upward and on account of its smaller diameter near the discharge spout $h^7$ the spent-hops are pressed out, the wort running toward the strainer S along the bottom $h^3$. It will be observed that the coarser particles of the hops are retained within the perforated bottom $h^2$ and are moved by the helical blades $h^1$ toward the spout $h^7$, while the wort or malt liquor enters the cylindrical casing $h^4$ and from here is filtered by means of the finely perforated mantle $h^5$, so that the hop-seeds and other foreign matter are retained in the casing $h^4$, which may be easily cleaned by unscrewing the disk $h^6$. The filtered wort or malt liquor is then conducted to coolers, not shown, for further treatment. It should be noted that the entire process, in order to prevent any undesirable hop-bitters to enter the wort, should be conducted while the temperature of the wort or malt liquor is about 200 degrees Fahrenheit, more or less. After the hops and hop seeds are separated from the brew, wort or malt-liquor, the strainer S, and conveyer H may be readily washed out.

It will be understood by those skilled in the art to which my invention pertains that modifications may be made without departing from the spirit of the invention, and

Having thus described the nature and objects of my invention, what I claim as new and desire to secure by Letters Patent is:

1. A combined hop-press and hop strainer adapted to be directly connected to the vessel in which the hops are added to the wort, said press and strainer comprising a conical helical conveyer, having a perforated bottom means for conducting the spent hops from the conveyer and means for collecting and filtering or straining all of the resulting wort, substantially as and for the purposes set forth.

2. An apparatus for separating the hops or other matter from a liquid, comprising an inclined conical conveyer attached directly to the discharge of the treating vessel and having a closed conical shell, a perforated bottom within the same, a discharge spout for the pressed-out matter, a strainer or filter attached to the lower end of the inclined conveyer, and means for conducting the filtered liquid away from the conveyer, substantially as and for the purposes set forth.

In witness whereof, I have hereunto set my hand in the presence of two subscribing witnesses.

CARL F. HETTINGER.

Witnesses:
CHARLES LIFFLER,
JOHN M. LINPPOLD.

---

Copies of this patent may be obtained for five cents each, by addressing the "Commissioner of Patents, Washington, D. C."